United States Patent [19]
Williams et al.

[11] Patent Number: 5,291,406
[45] Date of Patent: Mar. 1, 1994

[54] LAND VEHICLE SUSPENSION CONTROL SYSTEM

[75] Inventors: David A. Williams, Stoney Stratford; Peter G. Wright, Wymondham, both of United Kingdom

[73] Assignee: Group Lotus PLC, Norfolk, United Kingdom

[21] Appl. No.: 777,216

[22] PCT Filed: May 4, 1990

[86] PCT No.: PCT/GB90/00689
§ 371 Date: Dec. 13, 1991
§ 102(e) Date: Dec. 13, 1991

[87] PCT Pub. No.: WO90/13447
PCT Pub. Date: Nov. 15, 1990

[30] Foreign Application Priority Data
May 4, 1989 [GB] United Kingdom ............... 8910277

[51] Int. Cl.⁵ ............................................... B60G 17/01
[52] U.S. Cl. .............................. 364/424.05; 280/707; 280/840
[58] Field of Search ................ 364/424.05; 280/707, 280/840

[56] References Cited
U.S. PATENT DOCUMENTS

| | | | |
|---|---|---|---|
| 4,468,739 | 8/1984 | Woods et al. | 280/707 |
| 4,687,223 | 8/1987 | Miyoshi et al. | 280/707 |
| 4,821,191 | 4/1989 | Ikemoto et al. | 280/707 |
| 4,830,399 | 5/1989 | Häfner | 280/707 |
| 4,903,983 | 2/1990 | Fukushima et al. | 280/707 |
| 4,937,748 | 6/1990 | Yonekawa et al. | 280/840 |

FOREIGN PATENT DOCUMENTS

| | | |
|---|---|---|
| 0114757 | 8/1984 | European Pat. Off. |
| 0151421 | 8/1985 | European Pat. Off. |
| 3534211A1 | 3/1987 | Fed. Rep. of Germany |
| WO89/00512 | 1/1989 | PCT Int'l Appl. |

Primary Examiner—Gary Chin
Attorney, Agent, or Firm—Westman, Champlin & Kelly

[57] ABSTRACT

The invention relates to a land vehicle suspension control system comprising means (25) for measuring forces acting between the sprung mass (body) (20) of a vehicle and unsprung masses (wheel and hub assemblies) (11, 18) connected thereto, means for producing signals proportional to the measured loads and actuator means (14) operable to apply correcting forces in dependence on said signals to control the attitude of the vehicle, the actuator means being capable of stable operation to counteract loads acting on the vehicle including loads isolated from the means for measuring forces. The loads isolated from the means for measuring forces include those loads which are absorbed by passive isolators that are connected in series with the actuator means of the vehicle.

7 Claims, 2 Drawing Sheets

LAND VEHICLE SUSPENSION CONTROL SYSTEM

BACKGROUND OF THE INVENTION

This invention relates to a land vehicle suspension control system.

By "land vehicle" is meant a vehicle adapted for motion over the land in contact therewith, examples being motor cars, motor cycles, tractors and tracked vehicles.

In particular, the invention relates to a land vehicle suspension control system for a land vehicle having an active suspension system.

An active suspension system is a suspension system in which conventional suspension components, such as springs and dampers, are assisted or replaced by actuators operable, for example in response to command signals from a microprocessor, to correct, change or control the attitude of the vehicle. An aim of such active suspension systems is to minimize variations in the forces experienced by the vehicle body, thereby improving vehicle safety and enhancing driver and passenger comfort.

The command signals which control the actuators are generally derived from measured values of a number of variables defining the vehicle's attitude. In a truly active suspension system, there is the capability not merely of controlling the actuators in response to previously measured changes in the values of the variables, but also of, for example, inherently biasing the attitude of the vehicle to offset the effects of a known steady-state or dynamic loading, or of controlling the actuators in a manner predictive of expected land conditions.

Active suspension systems are now well known. For example, EP-A-0114757 discloses an active suspension system for a four-wheeled motor vehicle in which force measurements are taken at the points of support of the vehicle body on each wheel/hub assembly and processed to produce a demanded output of the actuator secured to operate between the respective wheel/hub assembly and the vehicle body.

The attitude of the vehicle can then- be controlled by converting the forces measured at the points of support to a set of modal forces (e.g. heave, pitch, roll and warp forces), from which the actuator outputs required to overcome the combined modal forces in order to maintain the desired attitude of the vehicle are then calculated.

A significant advantage of such an active suspension system is that the suspension characteristics of the vehicle can be continuously altered to accommodate varying road conditions and/or operating conditions of the vehicle. This facility permits the construction of a vehicle which has improved safety characteristics, since it is possible to maintain a greater degree of contact of the vehicle wheels with the land, and the behaviour of the vehicle is likely to be more predictable to the driver, than in the case of a vehicle not having an active suspension system.

A disadvantage of known active suspension systems is that the actuators employed between the vehicle body and the wheel/hub assemblies to apply force under the command of the microprocessor are imperfect in that they are not capable of implementing the command signals of the microprocessor accurately. For example, there is always a finite time delay between an actuator receiving a co=and signal and the piston of the actuator moving in response to the command signal.

Since the control system of an active suspension system operates very rapidly, such time delays cannot be tolerated since, for example, the resulting delayed operation of an actuator in response to a first command of the microprocessor may interfere with the implementation of a subsequent command.

The output of an actuator in an active suspension system can be smoothed by the inclusion of an isolator block of, for example, rubber between the actuator and the body of the vehicle. Such isolator permits transmission only of loads of greater than a certain magnitude.

However, a disadvantageous effect of the inclusion of such isolators is that the vehicle body may move without the active suspension system either detecting or responding to the load causing such movement. This is because the isolators isolate the loads from the load cells of the system, which are usually disposed to sense loads acting between the actuator and the isolator. Thus, the isolators act as a separate passive suspension system within the active suspension system, and introduce an extra degree of freedom into the load path between the vehicle body and the road surface on which the vehicle stands or travels.

It has hitherto been impossible to accurately control the extension of an actuator having an isolator disposed between it and the vehicle body, since accurate feedback measurement of the actuator response to a commanded signal is not possible when the isolator at least partially isolates the loads which it is required to measure from the load cell of the actuator.

SUMMARY OF THE INVENTION

According to the invention there is provided a land vehicle suspension control system comprising means for measuring forces acting between the sprung mass of the vehicle and unsprung masses connected thereto; means for producing signals proportional to said measured loads; and actuator means operable to apply correcting forces in dependence on said signals to control the attitude of said vehicle, said actuator means being capable of stable operation to counteract loads acting on said vehicle body including loads isolated from said means for measuring forces.

BRIEF DESCRIPTION OF THE DRAWINGS

The invention will now be described by way of example with reference to the drawings, in which.

DETAILED DESCRIPTION OF THE PREFERRED EMBODIMENTS

Figure 1:
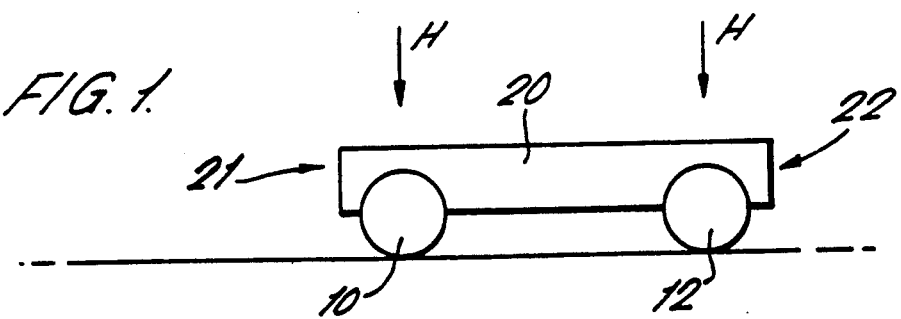
FIG. 1 is a schematic representation of the effects of heave forces on the body of a motor vehicle not having an active suspension system.

Referring to the drawings, FIGS. 1 to 4 show schematically a vehicle comprising a sprung mass in the form of a motor vehicle body 20 and four unsprung masses, i.e. four wheels 10, 11, 12, 13 and an interconnecting suspension system (not shown) for the wheels. The vehicle body 20 includes the engine, transmission and all the ancillary components of the motor vehicle.

FIGS. 1 to 4 are schematic representations of the typical displacements of the vehicle body 30 occasioned by heave, pitch, roll and warp forces respectively. In FIGS. 1 to 4 the front, left hand wheel of the vehicle is referenced 10, the front right hand wheel is referenced 11, the rear left hand wheel is referenced 12, and the rear right hand wheel is referenced 13. The heave, pitch, roll and warp forces are respectively indicated by arrows H, P, R and W. The modal forces shown in FIGS. 1 to 4 are indicated acting positively according to the sign convention adopted. The front of the vehicle is indicated generally by the reference 21, and the rear by reference 22.

In FIG. 1 the modal force of heave is an equal downward force acting on the four points of support of the vehicle body 20 on the wheels 10, 11, 12 and 13, and thus the vehicle body tends to move uniformly downwardly without tilting in any direction under the influence of positive heave.

Figure 2:
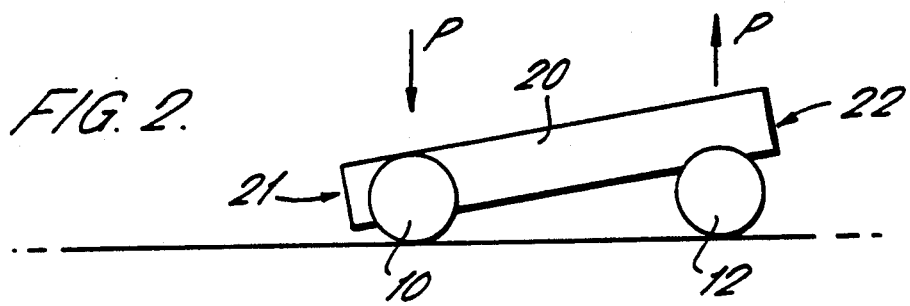
FIG. 2 is a schematic representation of the effects of pitch forces on the body of a motor vehicle not having an active suspension system.

Positive pitch modal forces are illustrated in FIG. 2 where it is shown that a positive pitch modal force applied to the vehicle body 20 tends to result in downward displacement of the front end 21 of the body with no tilting from side to side, and with the rear 22 of the vehicle being displaced upwardly from its original position.

Figure 3:
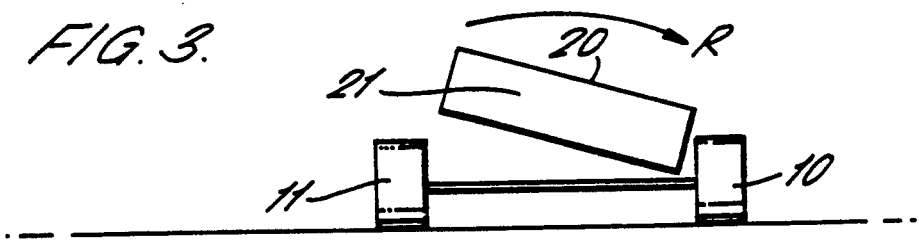
FIG. 3 is a schematic representation of the effects of roll forces on the body of a motor vehicle not having an active suspension system.

The positive roll modal force is shown in FIG. 3 as tending to produce a tilting displacement of the vehicle body about its longitudinal axis, with downward displacement of the left hand side of the vehicle body 20 and upward displacement of the right hand side.

Figure 4:
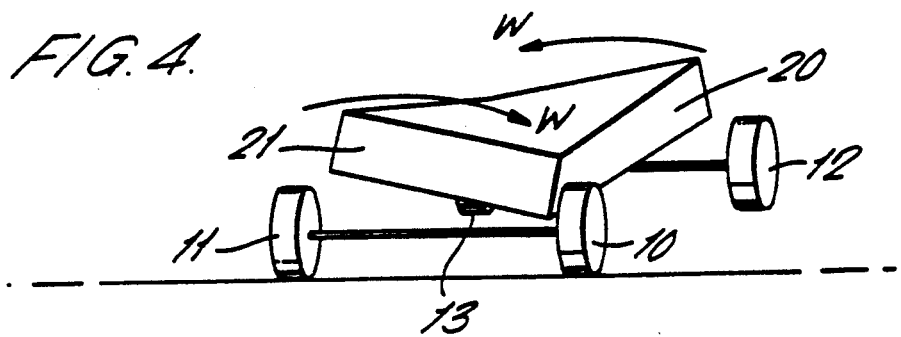
FIG. 4 is a schematic representation of the effects of warp forces on the body of a motor vehicle not having an active suspension system.

FIG. 4 shows the effect of a positive warp force on the vehicle body 20. A warp force tends to displace one pair of diagonally opposite corners of the vehicle body 20 downwardly and the other pair upwardly in the case of a generally rectangular body.

According to the sign convention used herein, the front left and rear right corners of the vehicle are downwardly displaced for positive values or warp forces.

It is helpful when considering the forces experienced by a vehicle body which may be resolved into modal forces to divide them into three categories.

The static loads of the vehicle represent the reaction forces required to support the mass of the vehicle and its cargo/passenger load when the vehicle is stationary.

The steady state loads on a vehicle in motion are those occasioned by the values of the variables of vehicle motion, such as steering angle, vehicle speed, vehicle acceleration/deceleration and the like.

The dynamic loads on a vehicle are those occasioned by "road inputs", which the driver of the vehicle cannot predict. Such dynamic loads occur, for example, when a gust of cross-wind influences the vehicle, and when a wheel of the vehicle encounters a bump in the road surface.

Figure 5:
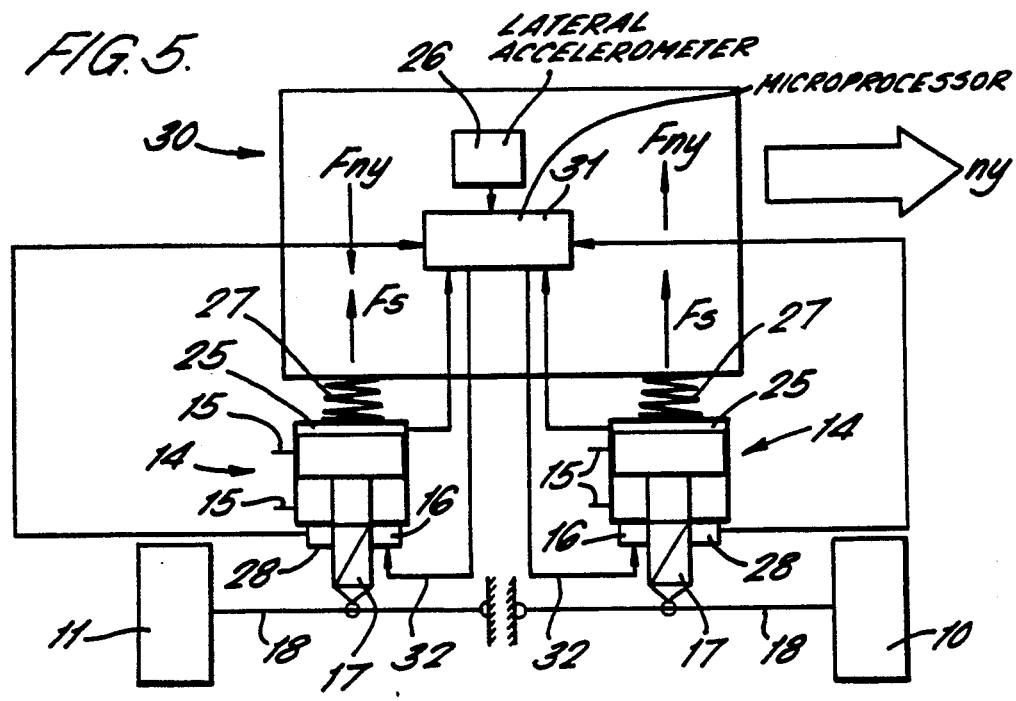
FIG. 5 is a schematic elevational view of a vehicle having a control system according to the invention.

Referring to FIG. 5, there is shown a schematic, elevational view of a motor vehicle having a control system according to the invention.

The motor vehicle has four wheels of which two, 10 and 11, are visible in FIG. 5. Each wheel is supported on a hub assembly (not shown) which in turn is supported on an axle member 18 which is pivotally secured at its end distant from the wheel to the vehicle body 20, as indicated schematically.

The vehicle has an active suspension system including four double-acting hydraulic actuators 14 respectively disposed to act between an axle member 18 and the vehicle body 20 in response to command signals from a microprocessor 31 disposed in the vehicle body 20. A rod 17 of each actuator 14 is pivotally secured to its associated axle member 18.

Each hydraulic actuator 14 has a pair of fluid supply lines 15 connected to a pump and reservoir (not shown) in a conventional manner of hydraulic components. The flow of hydraulic fluid to and from each actuator 14 is controlled by a servo valve 16 which operates in response to command signals from the microprocessor 31, carried by servo valve control wiring 32.

The active suspension system shown in FIG. 5 includes load cells 25 arranged respectively to measure the forces acting between each actuator 14 and the vehicle body 20. The signals from the load cells 25 are conditioned in microprocessor 31 and the actuators 14 are operated to provide the required level of correction to the vehicle body attitude, and to provide the required degree of damping between each wheel/hub assembly and the vehicle body 20. The required vehicle body attitude and levels of damping may be preprogrammed into microprocessor 31.

It has been found that, in order fully to control a vehicle using an active suspension system, many more variables associated with the motion of the vehicle body must be measured and processed than merely the load acting between each wheel/hub assembly and the vehicle body.

One such variable is the lateral acceleration of the vehicle body 20. The vehicle body 20 experiences lateral acceleration under a variety of circumstances, including, for example, that of the vehicle travelling around a curve. Therefore, the vehicle shown in FIG. 5 has a lateral accelerometer 26 located in the vehicle body 20 near the center of gravity of the vehicle. Lateral accelerometer 26 produces signals proportional to the lateral acceleration of the vehicle body 20 and these signals are passed to microprocessor 31. A sign convention is adopted in respect of lateral acceleration, and in FIG. 5 an arrow ny represents the direction of positive lateral acceleration.

When vehicle body 20 experiences lateral acceleration, roll forces are induced in the vehicle by virtue of a load shift from one side of the vehicle to the other. For example, when the vehicle experiences a steady lateral acceleration ny as shown by virtue of travelling around a constant radius bend having a center of curvature located somewhere to the left of wheel 11 and its corresponding wheel 13 at the rear of the vehicle, load is shifted onto the outermost wheels 10 and 12 from the center of curvature of the bend, and load is simultaneously shifted off the innermost wheels 11 and 13. Thus, the car tends to roll outwardly of the bend.

The load shift may be represented by the forces Fny shown in FIG. 5. Fny represents the vertical load reacted by the vehicle body 20 as a result of a lateral acceleration ny of the vehicle. Fny is therefore proportional to ny. As shown in FIG. 5, Fny acts vertically downwardly on the two corners of vehicle body 20 adjacent wheels 11 and 13, and vertically upwardly on the two corners of vehicle body 20 adjacent wheels 10 and 12 when ny acts as shown. Fny therefore adds to the load reaction at the right hand side of the vehicle as shown, and subtracts from it at the left hand side.

In practice, Fny is distributed in some ratio between the front and rear of the vehicle in accordance with the suspection characteristics thereof, but the illustration of FIG. 5 is simplified if it is assumed that an equal force, Fny, is reacted at each corner of the vehicle body 20.

Thus, for the two front corners visible in FIG. 5, the following equations apply:

At corner adjacent wheel 10:

$$Load\ reacted = Fs + Fny \qquad (1)$$

At corner adjacent wheel 11:

$$Load\ reacted = Fs - Fny \qquad (2)$$

where Fs is the static load of the vehicle body 20 reacted at each corner thereof.

In order to eliminate roll in the front of the vehicle body under the circumstances described above, the microprocessor 31 must be programmed to instigate a reaction force as determined by equation (1) above in the right hand actuator 14 shown in FIG. 5, and a reaction force as determined by equation (2) in the left hand actuator 14 shown in FIG. 5. Clearly similar considerations apply at the rear of the vehicle 30 (not shown).

It is advantageous to correct for the value of Fny in this manner because the lateral acceleration ny to which Fny is proportional may be readily measured. However, the actuators 14 and associated servo valves 16 which are presently available for use in active suspension systems are not able to respond sufficiently quickly to the command signals of the microprocessor 31 to enable satisfactory performance to result. This is principally due to the finite time which it takes for the valve of the Actuator to operate.

It is therefore desirable to allow the overall suspension system to have a delay which lengthens the time within which the actuator 14/servo valve 16 combination may operate, without such a system delay affecting the overall performance of the suspension system.

This effect is readily achieved by the use of rubber isolators, shown as springs 27 in FIG. 5, secured between the upper end of each actuator 14 and the vehicle body 20.

The isolators 27 permit limited movement of the actuators 14, for example during the valve opening period referred to above, without transmitting load to the vehicle body 20. If the actuator movement is greater than that which may be absorbed by the isolator, a corresponding load is transmitted to the vehicle body 20. Therefore, if the microprocessor 31 is suitably programmed, those actuator movements which are required to correct the attitude of the vehicle are transmitted to the vehicle body 20, while those movements which are due to the slow response of the actuator and servo valve in comprarison with the microprocessor 31 are not transmitted. An acceptable ride of the vehicle 30 may then be obtained.

A corollary to the beneficial effect of the isolators 27 described above is that loads on the vehicle body may be absorbed by the isolators 27 without the active suspension system responding. Clearly, this tends to defeat the object of including an active suspension system in a vehicle, since the isolators 27 operate reactively in the manner of conventional suspension components, with detrimental effects on the ride and handling of the vehicle.

It is not possible simply to extend the actuators 14 by an extra, estimated amount for every commanded extension to compensate for the above-described effect of the isolators 27 since any such extra extension, which may itself be required to act in either the vertically upward or the vertically downward direction, is highly likely to be unstable. This is both because the extra extension, which is load-derived, can only be estimated in the microprocessor 31, and because no feedback measurements may be taken to determine when the actuators 14 have compensated for the effects of their associated isolators 27. Therefore, a technique of estimating from measured loads the required extra actuator extension to offset the effect of the isolators 27 is not really practical.

A preferable approach is to use the readily measured value of ny to calculate the value of Fny according to the known characteristics of the vehicle and its suspension system, and then simply to over-extend the actuators 14 by an amount proportional to the calculated value of Fny. However, experience has shown that if such a method of compensating for the effects of the isolators 27 is implemented in the active suspension system of a vehicle, the ride and handling of the vehicle are again compromised, in this case by the remainder of the suspension settings as commanded by the microprocessor 31 being potentially in conflict with the commanded compensations for the isolators 27.

A better compensation for the disadvantageous effects of the isolators 27 is to synthesize directly from the value of ny, the measured vehicle lateral acceleration, the value of DXny, which is the value of the extra displacement of an actuator 14 required to compensate for a lateral acceleration ny as "seen" by the isolator 27. DXny is directly proportional to the value of Fny, but since it is automatically produced as a displacement command, its calculation and implementation do not interact with the measured and calculated load values used to correct the attitude of the vehicle body 20. Furthermore, displacement transducers such as linear variable inductive transducers (LVIT's) 28 measuring the actual extension of the actuators 14 may be used to produce Outputs which can be compared with the calculated values of DXny for each actuator 14 in a displacement error loop, a part of which is shown in FIG. 6, to ensure stable extension of each actuator 14 under load.

Figure 6:
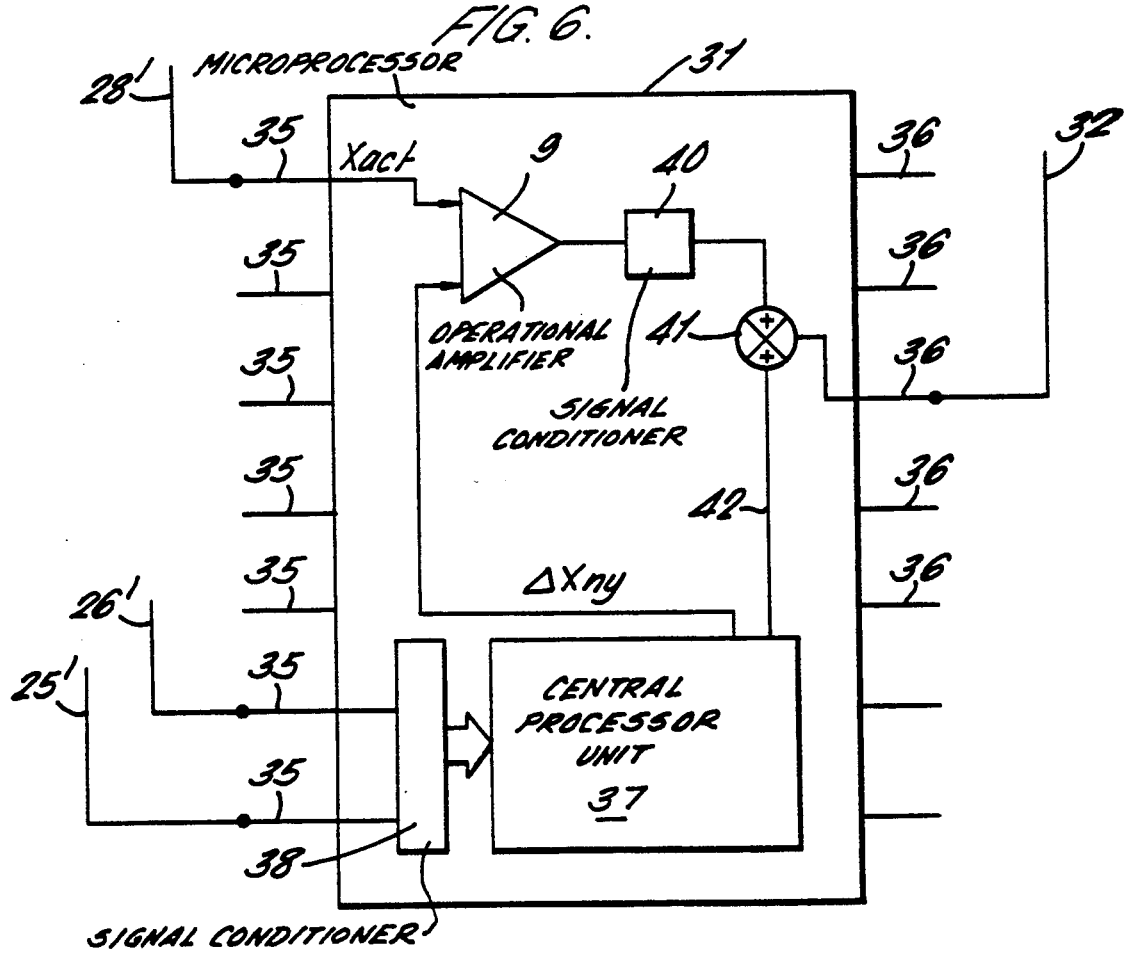
FIG. 6 is a schematic representation of a portion of the system of FIG. 5.

In FIG. 6, there is shown the output stage of microprocessor 31.

Microprocessor 31 has a number of input terminals 35 and a number of output terminals 36. The terminals 35 receive signals from, inter alia, the load cells 25, the lateral accelerometer 26, and LVIT's 28. In FIG. 6, the wiring representing one quarter of the control system of a four wheel vehicle, corresponding to one of the four actuators 14, is shown. The circuits for the remainder of the control system are similar.

In FIG. 6, wires 25', 26' and 28' carry the signals from the load cell 25, the lateral accelerometer 26 and the LVIT 28, which signals are input to the central processor unit (CPU) 37 of the microprocessor 31 after conditioning in a signal conditioner 38. From these signals, the CPU calculates the value of DXny, the required displacement of the actuator 14 to correct the vehicle body against loads induced by lateral acceleration thereof.

This value of DXny is compared in a comparator in the form of operational amplifier 29 with the value of Xact, the actual actuator position measured by LVIT 28. The resulting displacement error signal is then in a suitable form for output to the servo valve 16 via servo valve wiring 32. However, the remainder of the output of CPU 37, which includes corrections for the dynamic inputs to the load cell 25, must be combined with the output of operational amplifier 29. The output of operational amplifier 29 is therefore conditioned in further signal conditioner 40 to enable it to be combined in summing junction 41 with the dynamic output of CPU 37 carried by line 42. The resulting combined output is transmitted to servo valve 16 via an output terminal 36 and servo valve control wiring 32.

Although in the system described above it is lateral acceleration of the vehicle which is used for control of the actuators, it will be appreciated that other parameters can otherwise be used, for example yaw acceleration.

The applicant further envisages a method of counteracting loads acting on the vehicle body isolated from the means from measuring forces, in which the sprung mass motion which results from external forces acting against the flexible elements (such as passive isolators) mounted in series with the actuators is counteracted by forcing the actuators to move in the opposite direction in response to certain forces. The applicant envisages only counteracting the external forces acting against the flexible elements that arise from loads being transmitted to the vehicle body through suspension linkages (rather than the actuator) and also aerodynamic loads.

The modal motion required of the actuator to compensate for applied loads to flexible elements in the suspension is as follows:

$$\{Xdm\} = -((Kt).(\{Fcf\} + \{Fcs\}))$$

where
{Xdm} is the vector of required modal displacements
{Fcf} is the vector of inertia force corrections (which will be discussed later)
{Fcs} is the vector of aerodynamic force corrections (which will be discussed later)
(Kt) is the flexibility matrix of the series stiffness elements in modal co-ordinates.

The required motion of the actuators is obtained by transforming the modal displacement vector back to actuator co-ordinates:

$$\{Xam\} = (Txc).\{Xdm\}$$

where
{Xam} is the vector of required additional and average actuator displacements
{Txc} is the transformation matrix transforming displacements in modal co-ordinates to actuator co-ordinates.

When it is anticipated that the aerodynamic load on the vehicle will be small these may be neglected.

The elements of the flexibility matrix required for the above can be calculated when the geometrical arrangement of the suspension linkages is known and when the stiffness of the various flexible elements mounted in series with the actuator and parallel springs is known. Alternatively the elements may be determined experimentally by applying external forces to the sprung mass of a vehicle fitted with the Active Suspension System of the invention and measuring the deflections of the spring mass with the actuators undeflected and transforming the elements in to modal co-ordinates.

The vector of inertia force correction terms {Fcf} can be written in matrix notation as follows:

$$\{Fcf\} = \{\Phi n\}.\{\Gamma E\}$$

Where
{Fcf} is the vector of inertia force corrections in modal co-ordinates
{Γn} is the matrix of inertia correction coefficients
(ΦE) is the transpose of the vector {nx+,nx,ny,Dr}
where
nx is longintudinal acceleration
ny is lateral acceleration
Dr is yaw acceleration The elements of the matrix of inertia correction coefficients can be calculated once the precise geometric arrangement of the suspension linkages is known, that is to say when it can be determined what forces are transmitted directly to the vehicle body by the suspension lingages rather than the actuators and what spurious loads are transmitted through the actuator by reason of the suspension linkage. A more efficient method of evaluating the coefficients is to execute a series of maneuvers on a smooth surface with the target Active Suspension vehicle, and to adjust the elements of the correction coefficient matrix until the corrected modal vector shows no change during the maneuvers. A further alternative is to calculate the significant coefficients and adjust them automatically during normal operation of the vehicle.

When significant aerodynamic loads are generated by the sprung mass it is preferable to measure the free stream kinematic pressure of the gases passing over the vehicle so that a correction term may be included in the control of the vehicle suspension, the correction term being as follows:

$$\{Fcs\} = \{\Gamma ae\} (Kp)$$

Where
{Fcs} is the vector of force corrections in modal co-ordinates
{Γae} is the vector of aerodynamic coefficients
Kp is the measured vehicle kinematic pressure.

The elements of the vector of aerodynamic coefficients can be estimated experimentally, either from wind tunnel tests or by plotting the change of average measured vertical load with kinematic pressure when the vehicle is travelling in a straight line.

It will then be seen that the apparatus of the invention is highly versatile, in that it is capable of providing stable extension of actuator 14 under load, by virtue of using a feedback error loop utilising distinct signals from those devices which are used for overall control of the system in which the actuator operates.

Although in the system described above there are rubber isolators between the actuators and the vehicle body, it will be appreciated that isolation as described can be achieved in other ways, and may in fact derive from the inherent properties of other components of the vehicle.

What is claimed is:
1. A land vehicle suspension system comprising:

means for measuring forces acting between the sprung mass of the vehicle and the unsprung masses connected thereto, comprising first means for measuring steady state loads and second means for measuring dynamic loads;

means for generating signals proportional to the measured loads, comprising first means for generating signals proportional to the steady state loads and second means for generating signals proportional to the dynamic loads;

actuator means connected between the unsprung masses and the sprung mass of the vehicle;

processor means for processing the signals proportional to the measured loads and for generating control signals to control the actuator means to extend and contract to vary the position of the sprung mass relative to the unsprung masses; and isolator means connected in series with the actuator means between the unsprung masses and the sprung mass which deforms to absorb a portion of the forces acting on the actuator means resulting from forces on the sprung mass and the unsprung masses, wherein the processor means calculates from the measured load signals the deformation of the isolator means resulting from the steady state loads and modifies the control signals supplied to the actuator means to compensate for the deformation of the isolator means resulting from the steady state loads by causing the actuator means to either extend or contract in a sense opposite to the deformation of the isolator means.

2. A land vehicle suspension system as claimed in claim 1 wherein the processor means modifies the signals supplied to the actuator means solely to compensate the deformation of the isolator means resulting from said steady state loads.

3. A land vehicle suspension system as claimed in claim 1 wherein the means for measuring forces includes means for measuring aerodynamic loading on the sprung mass and the means for generating signals proportional to the measured forces includes means for generating signals proportional to said aerodynamic loading and wherein the processor means processes the signals proportional to said aerodynamic loading and supplies control signals to the actuator means to compensate for the deformation of the isolator means due to said aerodynamic loading on the sprung mass by causing the actuator means to extend and contract in a sense opposite to the deformation of the isolator means.

4. A land vehicle suspension control system as claimed in claim 1 wherein the means for measuring forces includes means for measuring one or more of the longitudinal acceleration, lateral acceleration, yaw rate and steering angle of the vehicle and load cells interposed between the actuator means and the sprung mass of the vehicle for measuring forces transmitted therebetween.

5. A land vehicle suspension system as claimed in claim 1 wherein:

there is additionally provided means for measuring displacement of the actuator means and means for generating a measured displacement signal proportional to the displacement;

the processor means processes the signals proportional to the measured loads to generate a required displacement signal, the required displacement signal being indicative of a displacement required of the actuator means; and the processing means compares the measured displacement signal with the required displacement signal in a closed loop displacement error loop system and thereby generates a displacement error signal as a control signal to control the actuator means.

6. A land vehicle suspension system as claimed in claim 1 wherein the isolator means comprises at least one isolator of resilient material interposed between the actuator means and either the sprung mass or one or more of the unsprung masses.

7. A control system as claimed in claim 1 wherein the first means for measuring steady state loads includes means for measuring the lateral acceleration of the vehicle body and producing signals proportional thereto and the processor means calculates from the measured load signals the deformation of the isolator means resulting from the lateral acceleration of the vehicle.

* * * * *